(12) United States Patent
Lang et al.

(10) Patent No.: US 11,088,997 B2
(45) Date of Patent: Aug. 10, 2021

(54) SECURE COMMUNICATION METHOD AND APPARATUS FOR VEHICLE, MULTIMEDIA SYSTEM FOR VEHICLE, AND VEHICLE (71) Applicant: BYD COMPANY LIMITED, Guangdong (CN)

(72) Inventors: Wenlong Lang, Shenzhen (CN); Yan Yan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 337 days.

(21) Appl. No.: 16/088,338

(22) PCT Filed: Mar. 28, 2017

(86) PCT No.: PCT/CN2017/078462
§ 371 (c)(1),
(2) Date: Sep. 25, 2018

(87) PCT Pub. No.: WO2017/167188
PCT Pub. Date: Oct. 5, 2017

(65) Prior Publication Data
US 2019/0116161 A1 Apr. 18, 2019

(30) Foreign Application Priority Data

Mar. 31, 2016 (CN) .......................... 201610200503.2

(51) Int. Cl.
*H04L 29/06* (2006.01)
*H04W 12/04* (2021.01)
(Continued)

(52) U.S. Cl.
CPC .......... *H04L 63/0428* (2013.01); *G06F 21/60* (2013.01); *H04L 9/065* (2013.01);
(Continued)

(58) Field of Classification Search
CPC ... H04L 63/0428; H04L 9/0618; H04L 9/065; H04L 29/06; H04L 63/145; H04L 67/12; H04L 2209/84; G06F 21/60; H04W 12/04
See application file for complete search history.

(56) References Cited

U.S. PATENT DOCUMENTS 9,162,648 B1    10/2015  Weng et al.
2005/0041813 A1  2/2005  Forest et al.
(Continued)

FOREIGN PATENT DOCUMENTS

CN    103309315 A    9/2013
CN    103738266 A    4/2014
(Continued)

OTHER PUBLICATIONS

Xiaina Lv et al., AES encryption algorithm keyless entry system, Consumer Electronics, Communications and Networks (CECNET), 2012 2nd International conference on, IEEE, Apr. 21, 2012, pp. 3090-3093, XP03218179.

(Continued)

*Primary Examiner* — Samson B Lemma
*Assistant Examiner* — Zoha Piyadehghibi Tafaghodi (57) ABSTRACT

The present application discloses a method and a device for vehicle security communication, a vehicle multimedia system, and a vehicle. The method applied to a security chip comprises: receiving a control instruction from a network system when the network system is connected, wherein the control instruction includes encrypted control data; decrypting the encrypted control data in the control instruction; obtaining the decrypted control data when the decryption is successful; and transmitting the decrypted control data to the vehicle body system to make the vehicle body system control the vehicle to perform a target operation according to the decrypted control data.

15 Claims, 8 Drawing Sheets

(51) Int. Cl.
*G06F 21/60* (2013.01)
*H04L 9/06* (2006.01)
*H04L 29/08* (2006.01)

(52) U.S. Cl.
CPC ............ *H04L 9/0618* (2013.01); *H04L 29/06* (2013.01); *H04L 63/145* (2013.01); *H04L 67/12* (2013.01); *H04W 12/04* (2013.01); *H04L 2209/84* (2013.01)

(56) References Cited

U.S. PATENT DOCUMENTS

| | | | | |
|---|---|---|---|---|
| 2009/0291637 | A1* | 11/2009 | Alrabady | H04L 63/0442 455/41.2 |
| 2010/0310068 | A1* | 12/2010 | Fischer | H04N 7/1675 380/43 |
| 2013/0219170 | A1* | 8/2013 | Naitou | H04L 63/0471 713/153 |
| 2014/0010371 | A1* | 1/2014 | Khazan | H04L 9/0894 380/278 |
| 2014/0281501 | A1* | 9/2014 | Korkishko | G06F 12/1408 713/156 |
| 2015/0156013 | A1* | 6/2015 | Zhao | H04L 63/08 380/270 |
| 2015/0363986 | A1* | 12/2015 | Hoyos | G07C 9/00563 340/5.61 |
| 2016/0035148 | A1* | 2/2016 | Huang | H04L 9/0866 701/31.4 |
| 2016/0080890 | A1* | 3/2016 | Shao | H04W 4/70 701/36 |
| 2017/0180330 | A1 | 6/2017 | Su et al. | |

FOREIGN PATENT DOCUMENTS

| | | |
|---|---|---|
| CN | 103809574 A | 5/2014 |
| CN | 103954008 A | 7/2014 |
| CN | 105915576 A | 8/2016 |

OTHER PUBLICATIONS

Supplementary European Search Report for Application No. EP17773218, dated Mar. 11, 2019, 7 pages.
International Search Report and Written Opinion for Application No. PCT/CN2017/078462, dated May 27, 2017, 10 pages.

* cited by examiner

FIG. 15

SECURE COMMUNICATION METHOD AND APPARATUS FOR VEHICLE, MULTIMEDIA SYSTEM FOR VEHICLE, AND VEHICLE

CROSS-REFERENCE TO RELATED APPLICATIONS

The present application is a national phase application of International Patent Application No. PCT/CN2017/078462, filed on Mar. 28, 2017, which claims priority to and benefits of Chinese Patent Application No. 201610200503.2, filed on Mar. 31, 2016. The contents of the above-referenced applications are incorporated herein by reference in their entirety.

TECHNICAL FIELD

The present application relates to the field of networks of vehicle, and in particular to a method and a device for vehicle security communication, a vehicle multimedia system and a vehicle.

BACKGROUND

With the development of large-screen vehicle multimedia and the popularity of vehicle networks, 4G and WIFI hotspots, vehicle multimedia has gradually become another important mobile terminal system for vehicle owners. The traditional car-machine control system having small screens gradually cannot satisfy more and more entertainment and multimedia needs for users. At present, many vehicle multimedia devices are equipped with 4G modules and WIFI modules, and can access the networks and allow customers to install their favorite APPs by themselves. In addition, with the development of big data and cloud services, the technology of remote control of car-machine has emerged, wherein the vehicle multimedia is the carrier for accepting cloud services. However this will bring great security risks to customers because there are communication and interconnection between the vehicle multimedia and other components of the vehicle, and the vehicle multimedia will transmit many instructions to control other components of the vehicle. So once the vehicle multimedia is connected to the networks, the vehicle multimedia will be easily invaded by malicious programs just like a computer and a mobile phone, and the criminals will remotely simulate the cloud server to transmit false instructions to the vehicle. Once the vehicle multimedia is maliciously invaded, the vehicle multimedia may be remotely controlled to transmit false instructions to other components while the vehicle is running, affecting the safe driving of the driver. Therefore, it is necessary to guarantee information security when a vehicle multimedia accesses the networks.

SUMMARY

The object of the present application is to provide a method and a device for vehicle security communication, a vehicle multimedia system and a vehicle to improve the security of networks of vehicle communication.

In order to achieve the above object, according to a first aspect of the present application, a vehicle security communication method is provided, wherein the vehicle comprises a network system, a security chip and a vehicle body system, the network system and the vehicle body system are connected by the security chip, the method is applied to the security chip, and the method comprises: receiving a control instruction from the network system when the network system is connected, wherein the control instruction comprises encrypted control data; decrypting the encrypted control data in the control instruction; obtaining decrypted control data when the decryption is successful; and transmitting the decrypted control data to the vehicle body system to make the vehicle body system control the vehicle to perform a target operation according to the decrypted control data.

According to a second aspect of the present application, a vehicle security communication method is provided, wherein the vehicle comprises a network system, a security chip and a vehicle body system, the network system and the vehicle body system are connected by the security chip, the method is applied to the vehicle body system, and the method comprises: receiving a first control data from the security chip when the network system is connected, wherein the first control data is obtained after the security chip successfully decrypts encrypted control data from the network system, and the first control data is used to indicate a first target operation to be performed by the vehicle; and controlling the vehicle to perform the first target operation according to the first control data.

According to a third aspect of the present application, a vehicle security communication device is provided, wherein the vehicle comprises a network system, a security chip and a vehicle body system, the network system and the vehicle body system are connected by the security chip, the device is provided in the security chip, and the device comprises: a first receiving module, configured to receive a control instruction from the network system when the network system is connected, wherein the control instruction includes encrypted control data; a decrypting module, configured to decrypt the encrypted control data in the control instruction, and obtain decrypted control data when the decryption is successful; and a first transmitting module, configured to transmit the decrypted control data to the vehicle body system to make the vehicle body system control the vehicle to perform a target operation according to the decrypted control data.

According to a fourth aspect of the present application, a vehicle security communication device is provided, wherein the vehicle comprises a network system, a security chip and a vehicle body system, the network system and the vehicle body system are connected by the security chip, the device is provided in the vehicle body system, and the device comprises: a third receiving module, configured to receive first control data from the security chip when the network system is connected, wherein the first control data is obtained after the security chip successfully decrypts encrypted control data from the network system, and the first control data is used to indicate a first target operation to be performed by the vehicle; and a control module, configured to control the vehicle to perform the first target operation according to the first control data.

According to a fifth aspect of the present application, a vehicle multimedia system is provided, wherein the system comprises: a network system for connecting a vehicle to the network and communicating with a server, the network system is used for receiving a control instruction from the sever, wherein the control instruction includes encrypted control data; a security chip comprising the vehicle security communication device according to the third aspect of the present application; and a vehicle body system communicating with the network system via the security chip, wherein the vehicle body system comprises the vehicle security communication device according to the fourth aspect of the present application.

According to a sixth aspect of the present application, a vehicle is provided, wherein the vehicle comprises the vehicle multimedia system according to the fifth aspect of the present application.

In the above technical solution, the encrypted control data is transmitted to the network system of the vehicle by the server, and the encrypted control data can be forwarded to the security chip by the network system in order to perform decryption processing by the security chip. Only after the decryption succeeds, the decrypted control data is transmitted to the vehicle body system, and then the vehicle body system will control the vehicle to perform the corresponding operation according to the control data. Thus, the security of networks of vehicle communication can be improved, and only legal control data can be transmitted to the vehicle body system to prevent the vehicle from being erroneously controlled due to the invasion of the malicious program, thereby ensuring the security of the vehicle remote control.

Other features and advantages of the present application will be described in detail in the following detailed description.

BRIEF DESCRIPTION OF THE DRAWINGS

The accompanying drawings are used to provide further understanding of the present application, and to constitute a part of the specification, which are used together with the following detailed description to explain the present application, but do not constitute a limitation to the present application. In the accompanying drawings.

DETAILED DESCRIPTION

The specific embodiments of the present application are described in detail below with reference to the accompanying drawings. It is to be understood that the specific embodiments described herein are intended to be illustrative and not restrictive.

Figure 1:
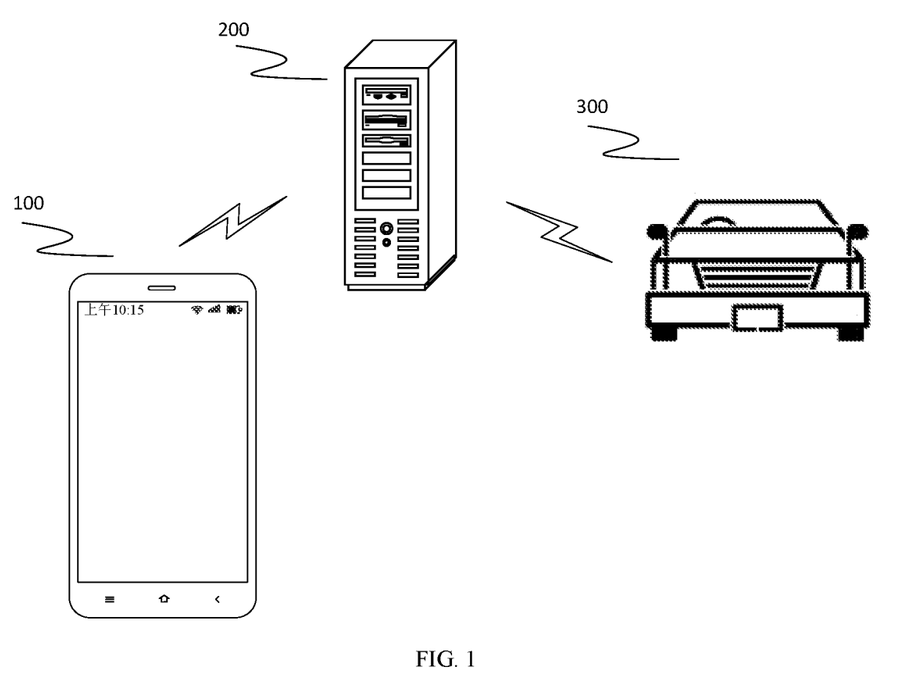
FIG. 1 is a schematic diagram of an implementation environment according to an exemplary embodiment.

FIG. 1 is a schematic diagram of an implementation environment according to an exemplary embodiment. As shown in FIG. 1, the implementation environment may include a user terminal 100, a server 200, and a vehicle 300.

In the present application, the server 200 may be an electronic device that provides service to the vehicle 300, which may be owned by a service provider of the vehicle 300. A user can register on the server 200 through the user terminal 100 to associate the user terminal 100 with the vehicle 300, so that the user terminal 100 can communicate with the vehicle 300 via the server 200, thereby realizing remote control of the vehicle 300 by the user. In addition, the vehicle 300 can further feed vehicle-related data back to the server 200 so that the service provider can perform remote maintenance to the vehicle 300, and if necessary, the server 200 can also feed the vehicle-related data back to the user terminal 100, thereby enabling the user to be able to keep track of the condition of the vehicle.

In the present application, the user terminal 100 may be an electronic device capable of connecting to the network and communicating with the server 200. The user terminal 100 can be, for example, a smart phone, a tablet, a PC, a laptop, and the like. In FIG. 1, the user terminal 100 is shown as a smart phone.

Figure 2:
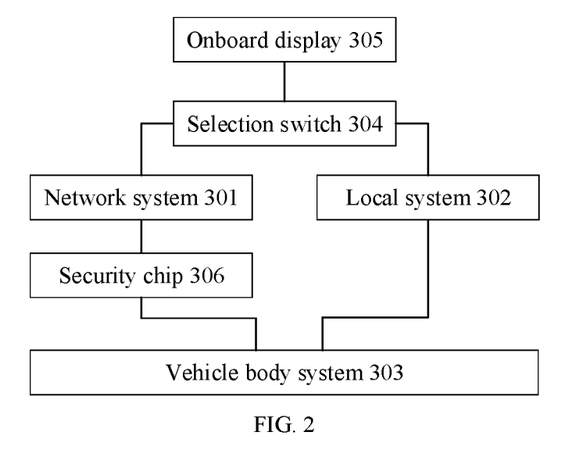
FIG. 2 is a block diagram of a vehicle multimedia system provided in a vehicle according to an exemplary embodiment.

In order to improve the security of the vehicle 300 when it is connected to the network, in the embodiment of the present application, the vehicle 300 is provided with a vehicle multimedia system having a dual system, and FIG. 2 is a block diagram of a vehicle multimedia system provided in the vehicle according to an exemplary embodiment. As shown in FIG. 2, the vehicle multimedia system can include a network system 301 and a local system 302. Wherein, the network system 301 is used for the vehicle 300 to connect to the network and communicate with an external device (for example, the server 200), and allow the user to install various APPs according to their preferences. In the present application, the network system 301 can be considered as an application processor carrying a network service module.

The local system 302 is not allowed to access the networks, and can only interact with the vehicle body system 303. In the present application, local system 302 can be considered as an application processor without a network service module. Additionally, the network system 301 and the local system 302 can be connected to an onboard display 305 via a selection switch 304. A user can operate the selection switch 304 to select whether the network system 301 is connected to the onboard display 305 or the local system 302 is connected to the onboard display 305. When the selection switch 304 is placed in a first switch position, the selection switch 304 is used to connect the line between the onboard display 305 and the network system 301, while the network system 301 is connected to the onboard display 305, and networking operations are available through the onboard display 305. When the selection switch 304 is placed in a second switch position, the selection switch 304 is used to connect the line between the onboard display 305 and the local system 302, while the local system 302 is connected to the onboard display 305, and only local control can be carried out through the onboard display 305, but no networking operation can be carried out. In the present application, the selection switch 304 is either used to connect the network system 301 or to connect the local system 302, thereby being able to maintain independent operation between the network system 301 and the local system 302.

It should be noted that, as an example, both the network system 301 and the local system 302 described in the present application may be an operating system. For example, the network system 301 can be an Android system and the local system 302 can be a Linux system. It should be understood that this example is merely illustrative of the network system 301 and the local system 302 and does not define the two systems. For example, the network system 301 can be a Linux system, the local system 302 can be an Android system, or both can be an Android system, and so on.

In the present application, in order to ensure the security of the vehicle control when the network system 301 is connected, as shown in FIG. 2, a security chip 306 is provided between the network system 301 and the vehicle body system 303, and the security chip 306 can provide services such as data encryption, identity authentication, limited secure storage and the like, thereby improving the security of the vehicle when it is connected to the network.

The method and device for vehicle security communication provided by the present application are described in detail below with reference to FIGS. 3 to 15.

Figure 3:
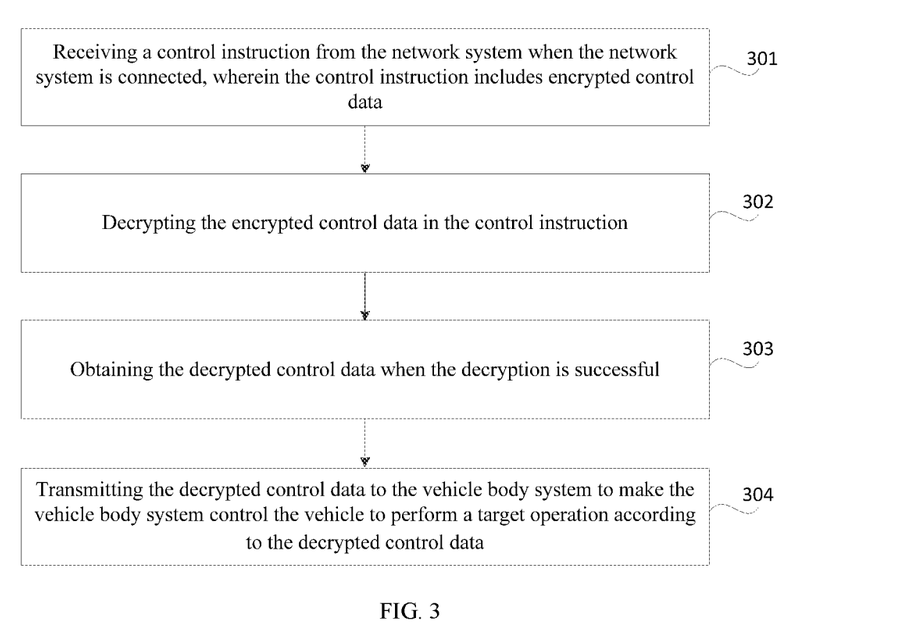
FIG. 3 is a flowchart of a method for vehicle security communication according to an exemplary embodiment.

FIG. 3 is a flowchart of a method for vehicle security communication according to an exemplary embodiment, wherein the method may be applied to a security chip, for example, the security chip 306 shown in FIG. 2. As shown in FIG. 3, the method can comprise:

In step S301, a control instruction from the network system is received when the network system is connected, wherein the control instruction may include encrypted control data.

As described above, when the network system 301 is connected, that is, when the network system 301 is operating, the network system 301 can communicate with the server 200, and the security chip 306 can receive the control instruction from the server 200 through the network system 301, so that the server 200 is capable of accomplishing a remote control of the vehicle. To ensure the security of the communication, the server 200 may first encrypt original control data (for example, the original control data may be from the user terminal 100) which is used for controlling the vehicle to perform a certain target operation. Wherein, the target operations may include, but are not limited to, the following: unlocking, starting, accelerating, decelerating, shutting down, locking car, window lifting, and the like. For example, the server 200 and the security chip 306 may have a pre-agreed encryption protocol, so that the server 200 may perform encryption processing on the original control data according to the encryption protocol, and obtain the corresponding encrypted control data. Thereafter, the server 200 can transmit the control instruction including the encrypted control data to the network system 301. After receiving the control instruction, the network system 301 can forward the control instruction to the security chip 306.

In step S302, the encrypted control data in the control instruction is decrypted.

For example, the security chip 306 can decrypt the encrypted control data according to the pre-agreed encryption protocol with the server 200.

In step S303, when the decryption is successful, the decrypted control data is obtained.

In step S304, the decrypted control data is transmitted to the vehicle body system to make the vehicle body system control the vehicle to perform the target operation according to the decrypted control data.

For example, assuming that the server 200 intends to issue control data for instructing the vehicle to perform an unlocking operation, then if the security chip decrypts successfully, the decrypted control data transmitted to the vehicle body system may also instruct the vehicle to perform the unlocking operation. Thereafter, the unlocking component in the vehicle body system can acquire this unlocking instruction and perform the unlocking operation according to the unlocking instruction.

Figure 4:
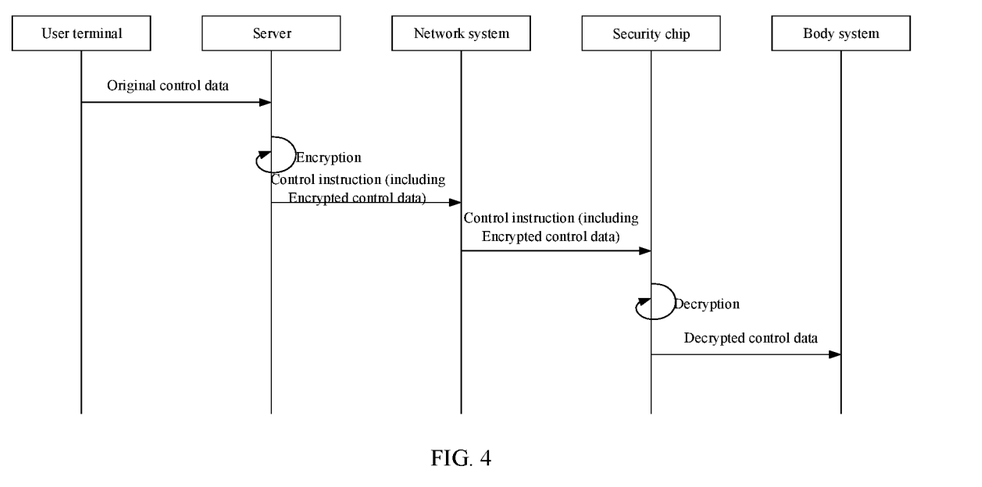
FIG. 4 is a diagram showing a signaling interaction among a user terminal, a server, a network system, a security chip, and a vehicle body system during vehicle communication, according to an exemplary embodiment.

FIG. 4 is a diagram showing a signaling interaction among a user terminal, a server, a network system, a security chip, and a vehicle body system during vehicle communication, according to an exemplary embodiment. Wherein, the user terminal is, for example, the user terminal 100 shown in FIG. 1, the server is, for example, the server 200 shown in FIG. 1, the network system is, for example, the network system 301 shown in FIG. 2, the security chip is, for example, the security chip 306 shown in FIG. 2, and the vehicle body system is, for example, the vehicle body system 303 shown in FIG. 2. FIG. 4 relates to the above steps using for the method for vehicle security communication for the security chip, and thus its specific signaling interaction process will not be described in detail herein.

Furthermore, although not shown in FIG. 3, the above method for vehicle security communication applied to the security chip may further include not transmitting any control data to the vehicle body system when the decryption fails. That is, once the decryption fails, the security chip can intercept control instructions from the network system. In this way, when a malicious program invades the network system and impersonates the network system to transmit a control instruction, the control instruction will not be transmitted to the vehicle body system due to the protection of the security chip, thereby ensuring the security of the vehicle.

In the above technical solution, the encrypted control data is transmitted to the network system of the vehicle by the server, and the encrypted control data can be forwarded to the security chip by the network system in order to perform decryption processing by the security chip. Only after the decryption succeeds, the decrypted control data is transmitted to the vehicle body system, and then the vehicle body system will control the vehicle to perform the corresponding operation according to the control data. Thus, the security of networks of vehicle communication can be improved, and only legal control data can be transmitted to the vehicle body system to prevent the vehicle from being erroneously controlled due to the invasion of the malicious program, thereby ensuring the security of the vehicle remote control.

Figure 5:
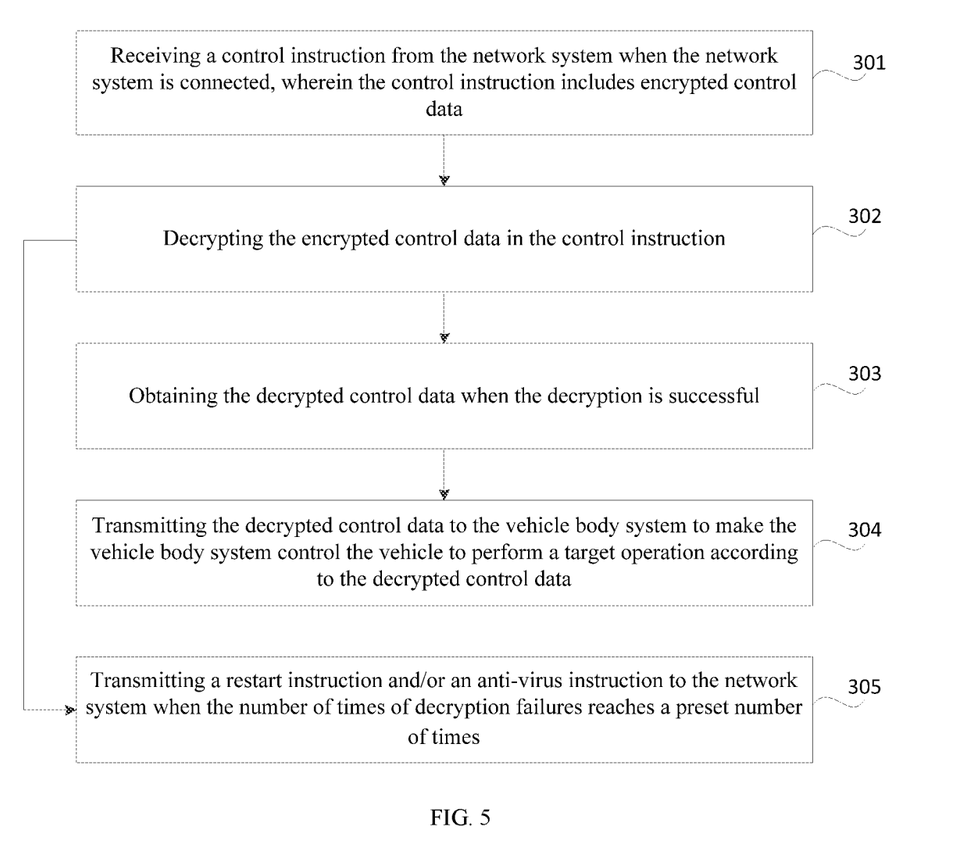
FIG. 5 is a flow chart of a method for vehicle security communication according to another exemplary embodiment.

FIG. 5 is a flowchart of a method for vehicle security communication according to another exemplary embodiment, wherein the method may be applied to a security chip, for example, the security chip 306 shown in FIG. 2. As shown in FIG. 5, based on the method shown in FIG. 3, the method may further include:

In step S305, when the number of times of decryption failure reaches a preset number of times, a restart instruction and/or an anti-virus instruction is transmitted to the network system 301, wherein the restart instruction is used to control the network system 301 to perform a restart operation, and the anti-virus instruction is used to control the network system 301 to perform an anti-virus operation.

That is, in this embodiment, the security chip 306 can count the number of decryption failures. When the number of decryption failures reaches a preset number of times (for example, ≤1), it indicates that the network system 301 may have a large potential security risk at this time. In this case, the security chip 306 can control the network system 301 to perform a restart operation, and/or control the network system 301 to perform an anti-virus operation. In this way, the security risk of the network system 301 can be relieved to a certain extent, and the malicious program is prevented from threatening the security of the network system 301 for a long time.

Figure 6:
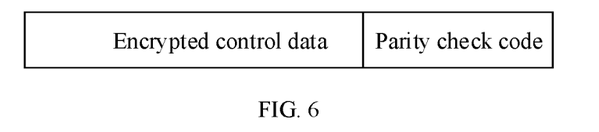
FIG. 6 is a schematic diagram showing the structure of an example control instruction.

In addition, in some alternative embodiments, the server 200 may further calculate a parity check code of the original control data. Then, the parity check code is contained in the control instruction together with the encrypted control data, and the control instruction is transmitted to the network system. For example, the structure of the control instruction at this time may be as shown in FIG. 6. After receiving the control instruction, the security chip 306 may first decrypt the encrypted control data therein, and if the decryption is successful, the decrypted control data can be obtained. Thereafter, the security chip 306 can calculate the parity check code of the decrypted control data. In theory, the decrypted control data should be identical to the original control data, so the parity check codes of both should be the same. When the parity check code included in the control instruction is consistent with the parity check code of the decrypted control data, at this time, the security chip 306 may further determine that the received control instruction is a legal instruction, and therefore, the decrypted control data can be transmitted to the vehicle body system. When the parity check code included in the control instruction is inconsistent with the parity check code of the decrypted control data, at this time, the security chip 306 may determine that the received control instruction is an illegal instruction, and at this time, the instruction may be intercepted, and no instruction is transmitted to the vehicle body system, thereby ensuring vehicle security.

Through the above embodiments, the identification accuracy of the legal instruction can be further improved, and the possibility of erroneously identifying an illegal instruction as a legal instruction can be reduced, thereby further improving the security of the vehicle.

The interaction between the network system and the security chip may sometimes be disturbed, resulting in an incomplete control instruction received by the security chip, thereby leading to subsequent security authentication failure. In order to prevent this from happening, in an alternative embodiment of the present application, the security chip may first determine whether the transmission of the control instruction is normal before decrypting the encrypted control data in the control instruction. The encrypted control data in the control instruction is decrypted only when it is determined that the transmission of the control instruction is normal.

For example, before transmitting the control instruction to the security chip, the network system first calculates the parity check code of the control instruction, and appends the parity check code to the tail of the control instruction to form a signaling which is then transmitted to the security chip. After receiving the signaling, the security chip can extract information other than the tail information and calculate the parity check code of the information. When the calculated parity check code is consistent with the parity check code included in the tail information, it indicates that the transmission of the control instruction is normal. Otherwise, it indicates that the transmission of the control instruction is abnormal.

When it is determined that the transmission of the control instruction is abnormal, the security chip may transmit a retransmission instruction to the network system, wherein the retransmission instruction may be used to instruct the network system to retransmit the control instruction.

Through this implementation, it is possible to avoid the decryption failure of the security chip caused by the transmission disturbance to the control instruction that is originally legal, thereby further improving the accuracy and reliability of the security authentication.

Figure 7:
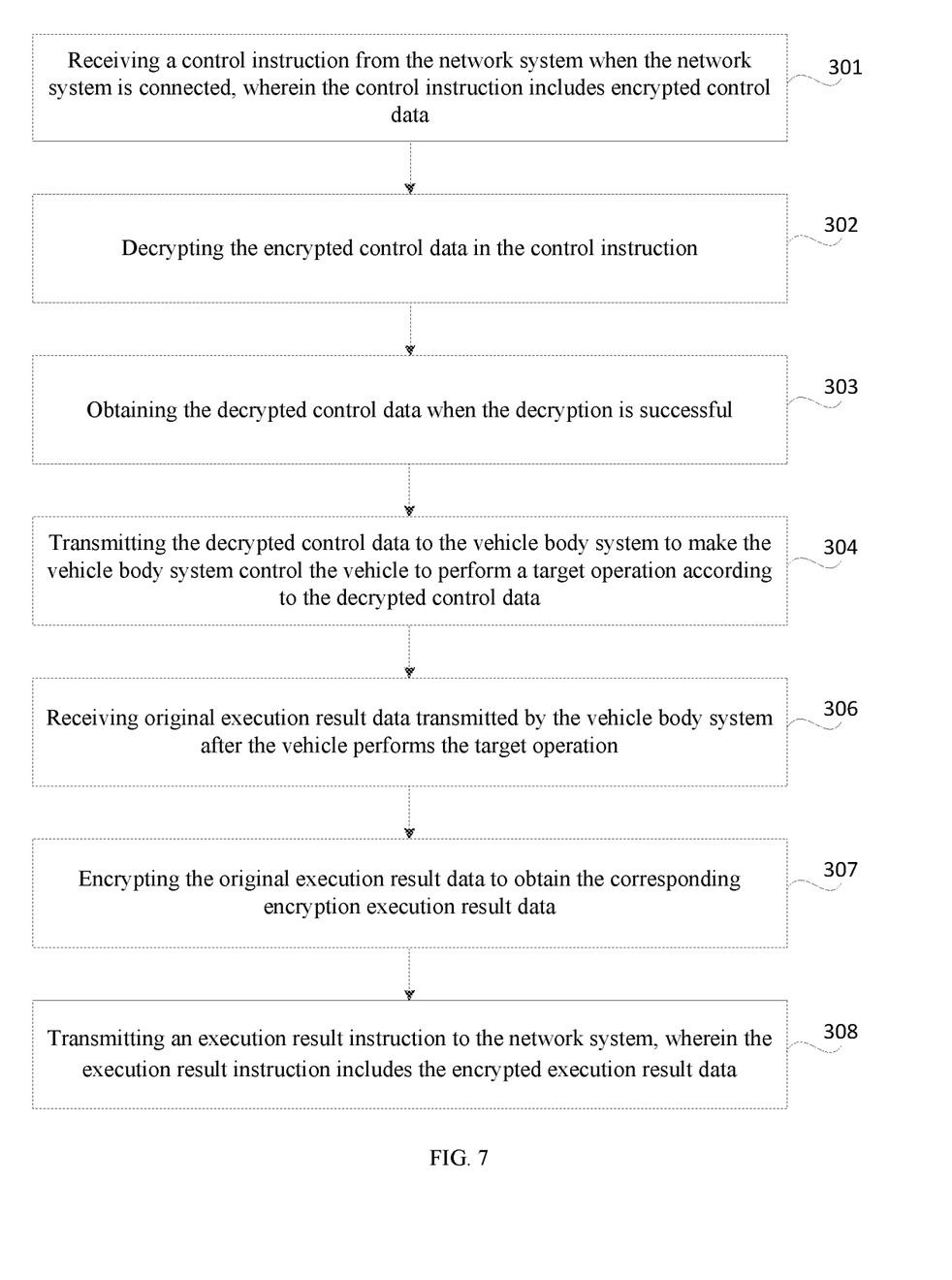
FIG. 7 is a flowchart of a method for vehicle security communication according to another exemplary embodiment.

FIG. 7 is a flowchart of a method for vehicle security communication according to another exemplary embodiment, wherein the method may be applied to a security chip, for example, the security chip 306 shown in FIG. 2. As shown in FIG. 7, on the basis of the method shown in FIG. 3, the method may further comprise:

In step S306, original execution result data transmitted by the vehicle body system after the vehicle performs the target operation is received.

The vehicle body system 303 can obtain the original execution result data after the vehicle performs the target operation, and the original execution result data can be the execution result data fed back by the corresponding executing component after performing the target operation. For example, when the original control data instructs the vehicle to perform an unlocking operation, the vehicle body system 303 can acquire unlocking result data from the unlocking component after the vehicle is unlocked. The vehicle body system 303 can transmit the original execution result data to the security chip 306.

In step S307, the original execution result data is encrypted to obtain the corresponding encryption execution result data.

As previously mentioned, the server 200 and the security chip 306 can have a pre-agreed encryption protocol, so that the security chip 306 can encrypt the received original execution result data according to the encryption protocol, and obtain the encryption execution result data.

In step S308, an execution result instruction is transmitted to the network system, wherein the execution result instruction includes the encrypted execution result data.

After receiving the execution result instruction from the security chip 306, the network system 301 can forward it to the server 200 for decryption processing by the server 200. As described above, the server 200 and the security chip 306 can have a pre-agreed encryption protocol, so that the server 200 can decrypt the encryption execution result data in the received execution result instruction according to the encryption protocol. When the decryption is successful, the decryption execution result data is obtained. Thereby, the server 200 can learn the execution result regarding the target operation, and if necessary, the server 200 can also transmit the decryption execution result data to the user terminal 100 to inform the user of the execution result of the target operation.

Figure 8:
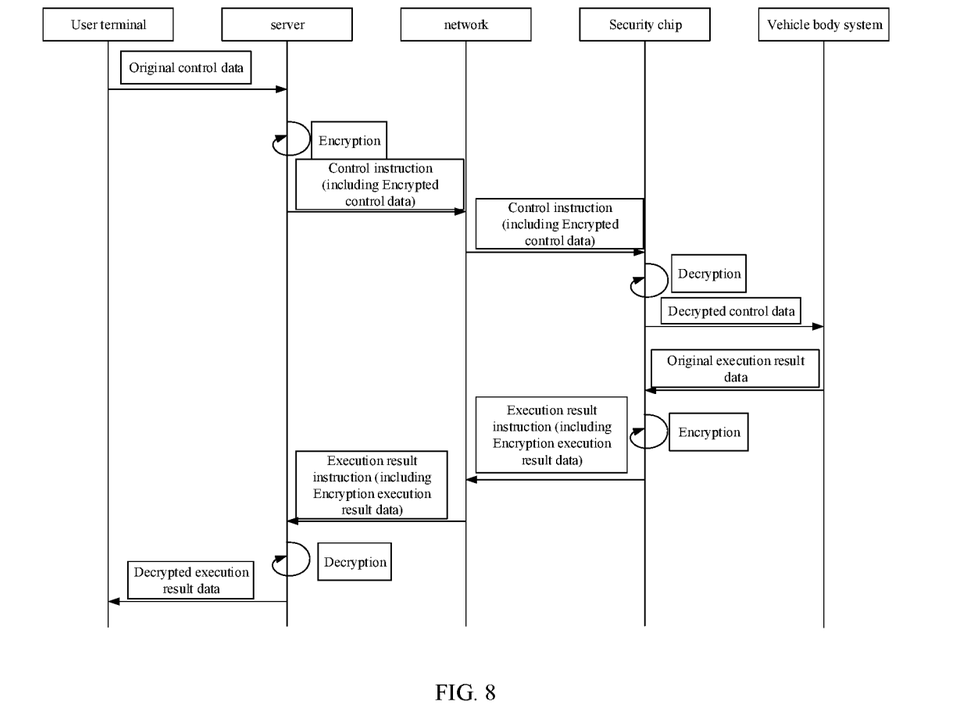
FIG. 8 is a diagram showing a signaling interaction among a user terminal, a server, a network system, a security chip, and a vehicle body system during vehicle communication, according to another exemplary embodiment.

FIG. 8 is a diagram showing a signaling interaction among a user terminal, a server, a network system, a security chip, and a vehicle body system during vehicle communication, according to another exemplary embodiment. Wherein, the user terminal is, for example, the user terminal 100 shown in FIG. 1, the server is, for example, the server 200 shown in FIG. 1, the network system is, for example, the network system 301 shown in FIG. 2, the security chip is, for example, the security chip 306 shown in FIG. 2, and the vehicle body system is, for example, the vehicle body system 303 shown in FIG. 2. FIG. 8 relates to the steps in the above-described vehicle security communication method for the security chip, and thus, its specific signaling interaction process will not be described in detail herein.

In the above technical solution, the execution result data from the vehicle body system is encrypted by the security chip, and the encryption execution result data is transmitted to the server through the network system in order to perform decryption processing by the server. Only when the decryption is successful, the server can get the execution result data from the vehicle body system. Thus, it is possible to prevent the illegal server owner from learning the vehicle information, thereby ensuring the security of the vehicle information.

Figure 9:
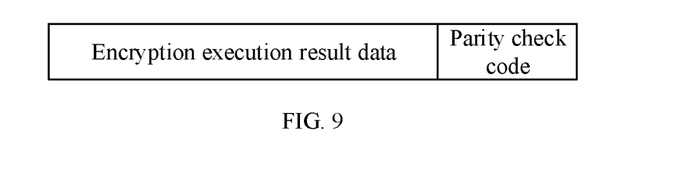
FIG. 9 is a schematic diagram showing the structure of an example execution result instruction.

In another embodiment of the present application, on the basis of the method shown in FIG. 7, the method may further include calculating the parity check code of the original execution result data. Thus, when performing the step 308, the security chip 306 can transmit the parity code including the original execution result data, and an execution result instruction of the encrypted execution result data to the network system 301. For example, the structure of the execution result instruction at this time can be as shown in FIG. 9.

After the network system 301 forwards the execution result instruction to the server 200, the server 200 may first decrypt the encryption execution result data therein, and if the decryption is successful, the decryption execution result data can be obtained. In theory, the decryption execution result data should be identical to the original execution result data, and therefore, the parity check codes of both should be the same. When the parity check code included in the execution result instruction is consistent with the parity check code of the decryption execution result data, at this time, the server may determine that the received execution result instruction is legal, wherein the decryption execution result data is from real vehicle data of the vehicle. Thereby, the security of the vehicle data can be further improved.

In addition, the interaction between the server and the network system, the interaction between the network system and the security chip, and the interaction between the security chip and the vehicle body system may sometimes be disturbed, resulting in incomplete original execution result data received by the security chip, or an incomplete execution result instruction received by the network system, or an incomplete execution result instruction received by the server, thereby leading to subsequent decryption failure. In order to prevent this from happening, in an alternative embodiment of the present application, the security chip may first determine whether the transmission of the original execution result data is normal before encrypting the original execution result data. The original execution result data is encrypted only when it is determined that the transmission of the original execution result data is normal.

For example, before transmitting the original execution result data to the security chip, the vehicle body system first can calculate a parity check code of the original execution result data, and append the parity check code to the tail of the original execution result data to form a signaling which is then transmitted to the security chip. After receiving the signaling, the security chip can extract information other than the tail information and calculate the parity check code of the information. When the calculated parity check code is consistent with the parity check code included in the tail information, it indicates that the transmission of the original execution result data is normal. Otherwise, it indicates that the transmission of the original execution result data is abnormal.

When it is determined that the transmission of the original execution result data is abnormal, the security chip may transmit a retransmission instruction to the vehicle body system, wherein the retransmission instruction may be used to instruct the vehicle body system to retransmit the original execution result data.

In addition, at the server side, it is possible to first determine whether the transmission of the execution result instruction is normal before decrypting the encryption execution result data in the received execution result instruction. The encryption execution result data in the execution result instruction is decrypted only when it is determined that the transmission of the execution result instruction is normal.

For example, before transmitting the execution result instruction to the network system, the security chip may first calculate a parity check code of the execution result instruction, and append the parity check code to the tail of the execution result instruction to form a signaling which is then transmitted to the network system. After receiving the signaling, the network system can extract information other than the tail information and calculate the parity check code of the information. When the calculated parity check code is consistent with the parity check code included in the tail information, it indicates that the transmission of the execution result instruction between the security chip and the network system is normal. Otherwise, it indicates that the transmission of the execution result instruction between the security chip and the network system is abnormal.

When the transmission of the execution result instruction between the security chip and the network system is normal, the network system can directly forward the signaling to the server. After receiving the signaling, the server may extract information other than the tail information and calculate a parity check code of the information. When the calculated parity check code is consistent with the parity check code included in the tail information, it indicates that the transmission of the execution result instruction between the server and the network system is normal. Otherwise, it indicates that the transmission of the execution result instruction between the server and the network system is abnormal.

When the transmission of the execution result instruction between the security chip and the network system is abnormal, the network system may transmit a retransmission instruction to the security chip, wherein the retransmission instruction is used to instruct the security chip to retransmit the execution result instruction. When the transmission of the execution result instruction between the server and the network system is abnormal, the server may transmit a retransmission instruction to the network system, wherein the retransmission instruction is used to instruct the network system to retransmit the execution result instruction.

Through this implementation, it is possible to avoid the decryption failure of the server caused by the transmission disturbance to the execution result instruction that is originally legal, thereby further improving the accuracy and reliability of the security authentication.

Figure 10:
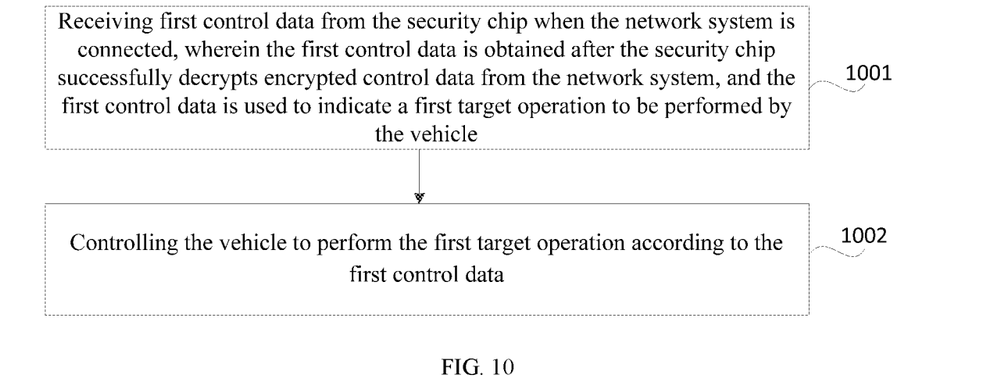
FIG. 10 is a flowchart of a method for vehicle security communication according to an exemplary embodiment.

FIG. 10 is a flowchart of a method for vehicle security communication according to an exemplary embodiment, wherein the method may be applied to a vehicle body system, for example, the vehicle body system 303 shown in FIG. 2. As shown in FIG. 10, the method may comprise:

In step S1001, first control data from the security chip is received when the network system is connected, wherein the first control data is obtained after the security chip successfully decrypts encrypted control data from the network system, and the first control data is used to indicate a first target operation to be performed by the vehicle.

In step S1002, the vehicle is controlled to perform the first target operation according to the first control data.

In the above technical solution, only the control data successfully decrypted by the security chip is transmitted to the vehicle body system, and at this time, the vehicle body system controls the vehicle to perform corresponding operations according to the control data. Thereby, the security of networks of vehicle communication can be improved, and only legal control data can be transmitted to the vehicle body system to prevent erroneous control of the vehicle due to the invasion of the malicious program, thereby ensuring the security of the vehicle remote control.

Figure 11:
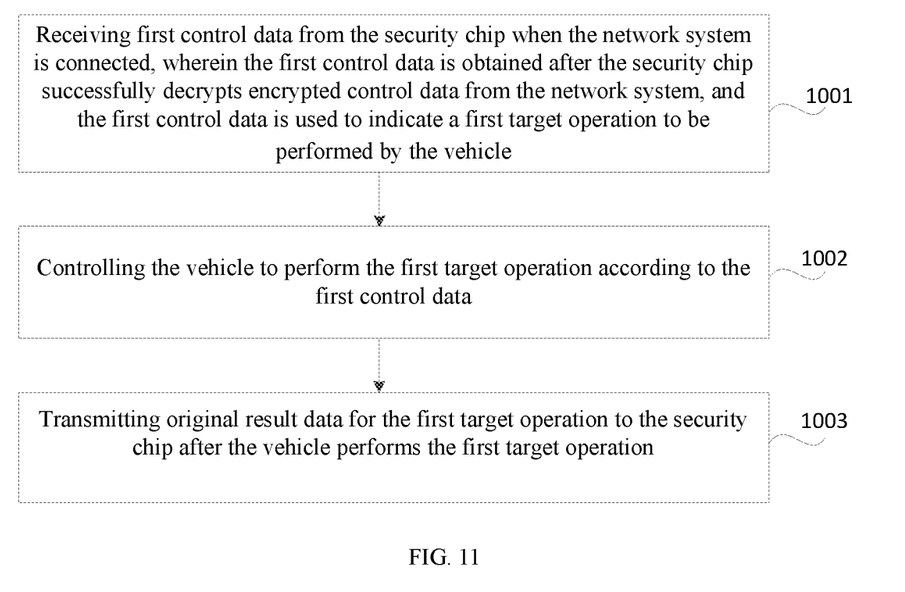
FIG. 11 is a flowchart of a method for vehicle security communication according to another exemplary embodiment.

FIG. 11 is a flowchart of a method for vehicle security communication according to another exemplary embodiment, wherein the method may be applied to a vehicle body system, for example, the vehicle body system 303 shown in FIG. 2. As shown in FIG. 11, based on the method shown in FIG. 10, the method may further include:

In step S1003, after the vehicle performs the first target operation, original execution result data for the first target operation is transmitted to the security chip, wherein the original execution result data is used for encryption by the security chip.

Encryption processing of the execution result data from the vehicle body system by the security chip ensures that only the legal server can successfully decrypt the encrypted execution result data, thereby preventing the illegal server owner from learning the vehicle information, thereby ensuring the security of vehicle information.

Figure 12:
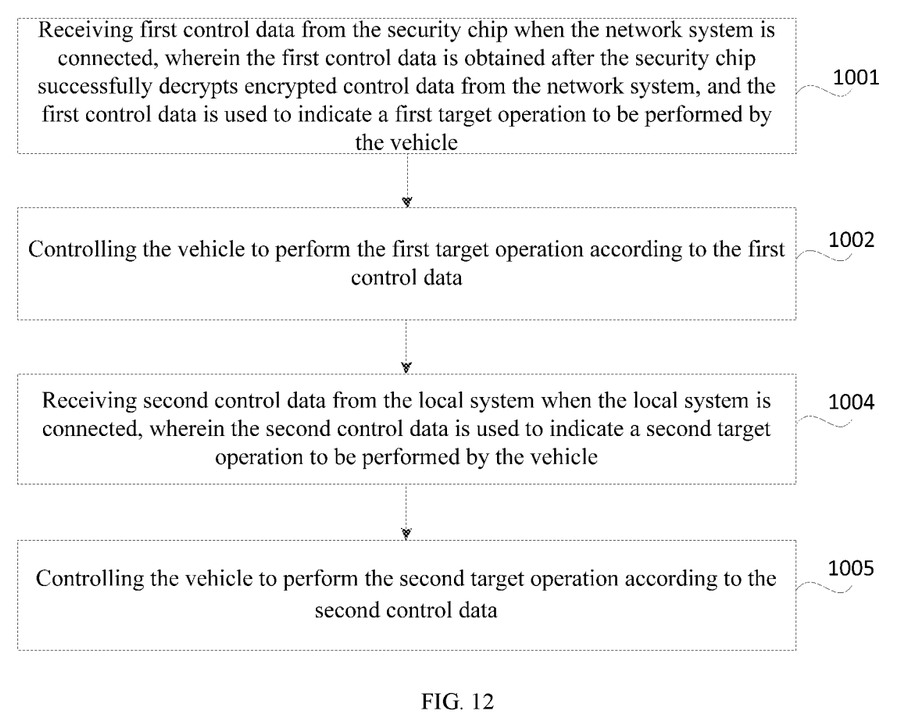
FIG. 12 is a flowchart of a method for vehicle security communication according to another exemplary embodiment.

FIG. 12 is a flowchart of a method for vehicle security communication according to another exemplary embodiment, wherein the method may be applied to a vehicle body system, for example, the vehicle body system 303 shown in FIG. 2. As shown in FIG. 12, based on the method shown in FIG. 10, the method may further include:

In step S1004, second control data from the local system is received when the local system is connected, wherein the second control data may be used to indicate a second target operation to be performed by the vehicle.

In step S1005, the vehicle is controlled to perform a second target operation according to the second control data.

As previously mentioned, the connection of the network system 301 to the onboard display 305 and the connection of the local system 302 to the onboard display 305 can be switched by operating the selection switch 304. When the local system 302 is connected, the vehicle does not have a networking function at this time, and the user can only locally control the vehicle through the onboard display 305. At this time, the vehicle body system 303 can receive the second control data from the local system 302 and control the vehicle to perform the second target operation according to the second control data, thereby implementing local control of the vehicle. Since the local system 302 does not have the networking function, it will not be attacked by the network, and will not pose a security threat to the vehicle control.

Figure 13:
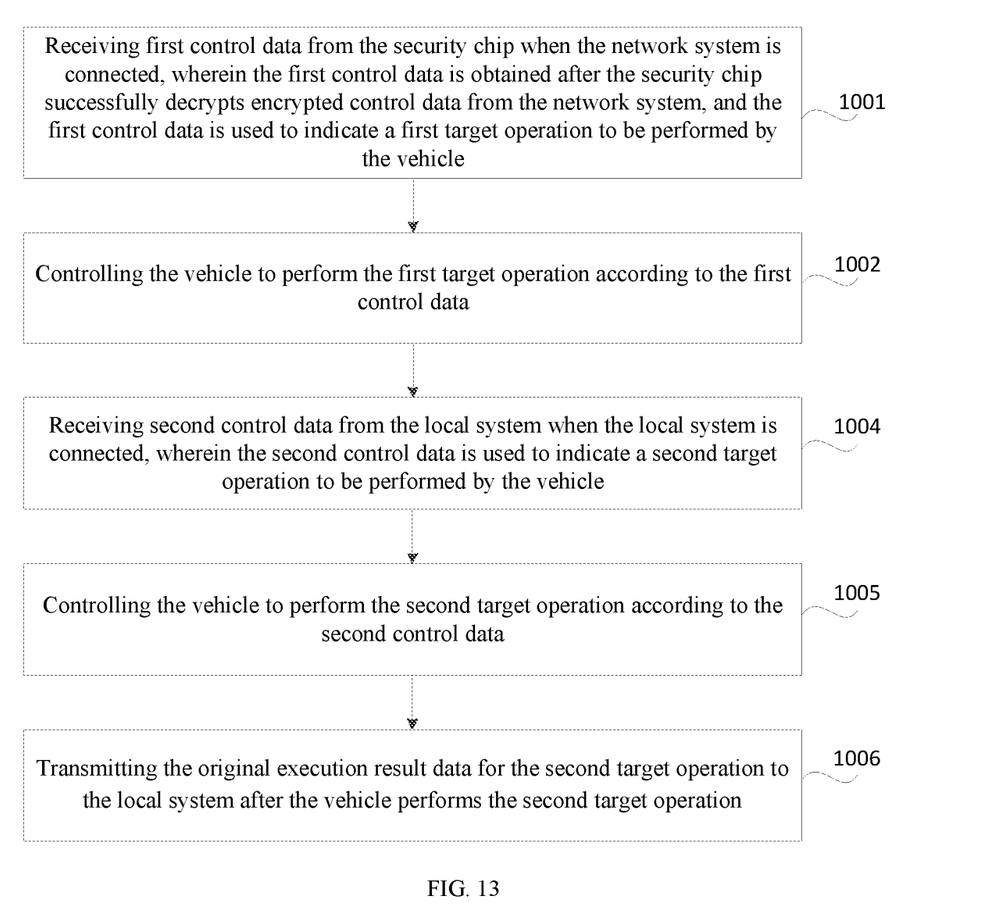
FIG. 13 is a flowchart of a method for vehicle security communication according to another exemplary embodiment.

FIG. 13 is a flowchart of a method for vehicle security communication according to another exemplary embodiment, wherein the method may be applied to a vehicle body system, for example, the vehicle body system 303 shown in FIG. 2. As shown in FIG. 13, based on the method shown in FIG. 12, the method may further include:

In step S1006, after the vehicle performs the second target operation, the original execution result data for the second target operation is transmitted to the local system. After receiving the original execution result data, the local system 302 can transmit it to the onboard display 305 for display, thereby facilitating the user to learn the execution result regarding the second target operation.

Figure 14:
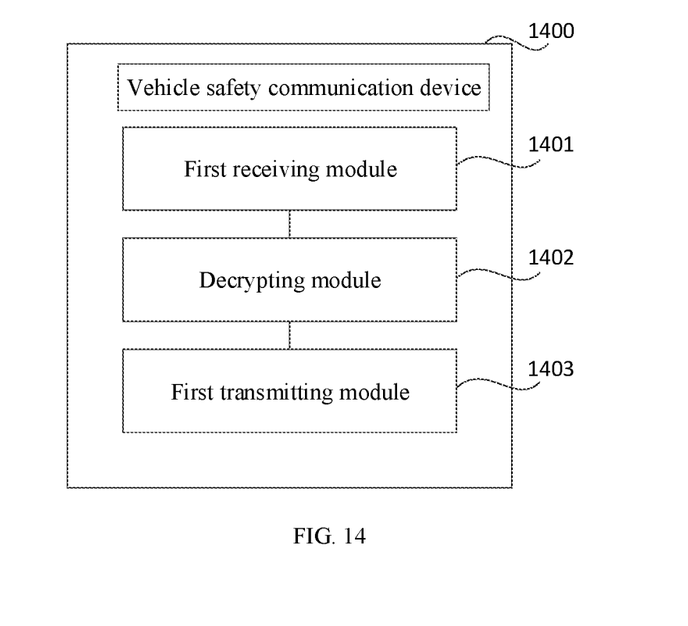
FIG. 14 is a block diagram of a vehicle security communication device according to an exemplary embodiment.

FIG. 14 is a block diagram of a vehicle security communication device according to an exemplary embodiment, wherein the device may be provided in a security chip, for example, the security chip 306 shown in FIG. 2. As shown in FIG. 14, the device 1400 can comprise: a first receiving module 1401 configured to receive a control instruction from a network system when the network system is connected, wherein the control instruction includes encrypted control data; a decrypting module 1402 configured to decrypt the encrypted control data in the control instruction, and obtain decrypted control data when the decryption is successful; and a first transmitting module 1403 configured to transmit the decrypted control data to a vehicle body system to make the vehicle body system control the vehicle to perform a target operation according to the decrypted control data.

In the above technical solution, the encrypted control data is transmitted to the network system of the vehicle by the server, and the encrypted control data can be forwarded to the security chip by the network system in order to perform decryption processing by the security chip. Only after the decryption succeeds, the decrypted control data is transmitted to the vehicle body system, and then the vehicle body system will control the vehicle to perform the corresponding operation according to the control data. Thereby, the security of networks of vehicle communication can be improved, and only legal control data can be transmitted to the vehicle body system to prevent erroneous control of the vehicle due to the invasion of the malicious program, thereby ensuring the security of the vehicle remote control.

Optionally, the device 1400 may further include a second transmitting module configured to transmit a restart instruction and/or an anti-virus instruction to the network system when the number of times of decryption failures of the decrypting module 1402 reaches a preset number of times, wherein the restart instruction is used to control the network system to perform a restart operation, and the anti-virus instruction is used to control the network system to perform an anti-virus operation.

Optionally, the control instruction may further include a parity check code associated with the original control data corresponding to the encrypted control data prior to be encrypted. In this case, the device 1400 may further include a first calculating module configured to calculate a parity check code of the decrypted control data, and the first transmitting module 1403 is configured to, when the parity check code included in the control instruction is consistent with the parity check code of the decrypted control data, transmit the decrypted control data to the vehicle body system.

Optionally, the device 1400 may further include: a second receiving module configured to receive original execution result data transmitted by the vehicle body system after the vehicle performs the target operation; a encrypting module configured to encrypt the original execution result data to obtain corresponding encryption execution result data; and a third transmitting module configured to transmit the execution result instruction to the network system, wherein the execution result instruction includes the encrypted encryption execution result data.

Optionally, the device 1400 may further include a second calculating module configured to calculate a parity check code of the original execution result data. In this case, the third transmitting module is configured to transmit the execution result instruction including the parity code of the original execution result data, and encrypted execution result data to the network system.

Figure 15:
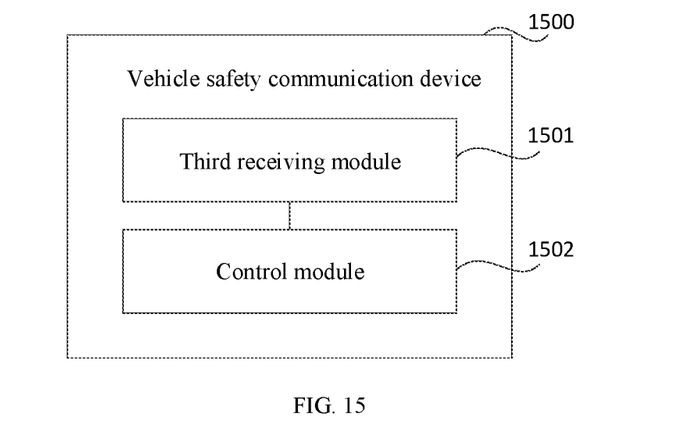
FIG. 15 is a block diagram of a vehicle security communication device according to an exemplary embodiment.

FIG. 15 is a block diagram of a vehicle security communication device according to an exemplary embodiment, wherein the device may be provided in a vehicle body system, for example, the vehicle body system 303 shown in FIG. 2. As shown in FIG. 15, the device 1500 may comprise: a third receiving module 1501 configured to receive first control data from the security chip when the network system is connected, wherein the first control data is obtained after the security chip successfully decrypts encrypted control data from the network system, and the first control data is used to indicate a first target operation to be performed by the vehicle; and a control module 1502 configured to control the vehicle to perform the first target operation according to the first control data.

In the above technical solution, only the control data successfully decrypted by the security chip is transmitted to the vehicle body system, and at this time, the vehicle body system controls the vehicle to perform corresponding operations according to the control data. Thereby, the security of networks of vehicle communication can be improved, and only legal control data can be transmitted to the vehicle body system to prevent erroneous control of the vehicle due to the invasion of the malicious program, thereby ensuring the security of the vehicle remote control.

Optionally, the device 1500 may further include a fourth transmitting module configured to transmit the original execution result data for the first target operation to the security chip after the vehicle performs the first target operation, wherein the original execution result data is used for performing encryption by security chip.

Optionally, the device 1500 may further include: a fourth receiving module configured to receive second control data from a local system when the local system is connected, wherein the second control data is used to indicate a second target operation to be performed by the vehicle, and the control module 1502 is further configured to control the vehicle to perform the second target operation according to the second control data.

Optionally, the device 1500 may further include: a fifth transmitting module configured to transmit the original execution result data for the second target operation to the local system after the vehicle performs the second target operation.

With regard to the device in the above embodiments, the specific manner in which the respective modules perform the operations has been described in detail in the embodiment relating to the method, and will not be explained in detail herein.

The preferred embodiments of the present application have been described in detail above with reference to the accompanying drawings. However, the present application is not limited to the specific details in the foregoing embodiments, and various simple modifications may be made to the technical solutions of the present application within the technical concept of the present application. These simple variations are within the scope of the present application.

It should be further noted that the specific technical features described in the above specific embodiments may be combined in any suitable manner without contradiction. In order to avoid unnecessary repetition, the present application will not be further described in various possible combinations.

In addition, any combination of various embodiments of the present application may be made as long as it does not contradict the idea of the present application, and it should also be regarded as the content disclosed in the present application.

The invention claimed is:

1. A vehicle security communication method, wherein the vehicle comprises a network system, a security chip, a local system, a selection switch, and a vehicle body system, the network system and the vehicle body system are connected by the security chip, the selection switch is configured to connect the local system to the vehicle body system or connect the network system to the vehicle body system, and the method comprises:

receiving a control instruction from the network system when the network system is connected to the vehicle body system, wherein the control instruction comprises encrypted control data comprising a first parity check code associated with original control data corresponding to the encrypted control data;

decrypting the encrypted control data in the control instruction;

obtaining decrypted control data when the decryption is successful;

calculating a second parity check code associated with the decrypted control data;

determining whether the first parity check code is consistent with the second parity check code; and in response to determining that the first parity check code is consistent with the second parity check code, transmitting the decrypted control data to the vehicle body system, wherein the vehicle body system is configured to control the vehicle to perform a target operation according to the decrypted control data.

2. The method according to claim 1, wherein the method further comprises:

transmitting a restart instruction or an anti-virus instruction to the network system when a number of times of decryption failure reaches a preset number of times, wherein the restart instruction is used to control the network system to perform a restart operation, and the anti-virus instruction is used to control the network system to perform an anti-virus operation.

3. The method according to claim 1, wherein the method further comprises:

receiving original execution result data transmitted by the vehicle body system after the vehicle performs the target operation;

encrypting the original execution result data to obtain corresponding encryption execution result data; and transmitting an execution result instruction to the network system, wherein the execution result instruction includes the encryption execution result data.

4. The method according to claim 3, wherein the method further comprises:

calculating a parity check code of the original execution result data; and the execution result instruction further includes the parity check code of the original execution result data.

5. A vehicle security communication method, wherein the vehicle comprises a network system, a security chip and, a local system, a selection switch, a vehicle body system, the network system and the vehicle body system are connected by the security chip, the selection switch is configured to connect the local system to the vehicle body system or connect the network system to the vehicle body system, and the method comprises:

receiving a first control data from the security chip, wherein the first control data is obtained after the security chip decrypts encrypted control data received from the network system, and the first control data indicates a first target operation to be performed by the vehicle, wherein the encrypted control data comprises a first parity check code associated with original control data corresponding to the encrypted control data;

calculating a second parity check code associated with the first control data;

determining whether the first parity check code is consistent with the second parity check code; and in response to determining that the first parity check code is consistent with the second parity check code, controlling the vehicle to perform the first target operation according to the first control data.

6. The method according to claim 5, wherein the method further comprises:

transmitting original execution result data for the first target operation to the security chip after the vehicle performs the first target operation, wherein the original execution result data is used for encryption by the security chip.

7. The method according to claim 5, wherein the local system is connected to the vehicle body system when the network system is disconnected from the vehicle body system, and the method further comprises:

receiving second control data from the local system when the local system is connected, wherein the second control data is used to indicate a second target operation to be performed by the vehicle;

controlling the vehicle to perform the second target operation according to the second control data.

8. The method according to claim 7, wherein the method further comprises:

transmitting original execution result data for the second target operation to the local system after the vehicle performs the second target operation.

9. A vehicle system, comprising:

a network system for connecting a vehicle to a network and communicate with an external device;

a vehicle body system configured to control vehicle operations;

a selection switch configured to connect a local system to the vehicle body system or connect the network system to the vehicle body system; and a security chip connected between the network system and vehicle body system, wherein the security chip is configured to:

receive a control instruction from the network system when the network system is connected to the vehicle body system, wherein the control instruction includes encrypted control data comprising a first parity check code associated with original control data corresponding to the encrypted control data;

decrypt the encrypted control data in the control instruction and obtain decrypted control data;

calculate a second parity check code associated with the decrypted control data;

determining whether the first parity check code is consistent with the second parity check code; and in response to determining that the first parity check code is consistent with the second parity check code, transmit the decrypted control data to the vehicle body system for the vehicle body system to control the vehicle to perform a target operation according to the decrypted control data.

10. The vehicle system according to claim 9, wherein the security chip is further configured to transmit a restart instruction or an anti-virus instruction to the network system when a number of times of decryption failure reaches a preset number, wherein the restart instruction is used to control the network system to perform a restart operation, and the anti-virus instruction is used to control the network system to perform an anti-virus operation.

11. The vehicle system according to claim 9, wherein the security chip is further configured to:

receive original execution result data transmitted by the vehicle body system after the vehicle performs the target operation;

encrypt the original execution result data to obtain corresponding encryption execution result data; and transmit an execution result instruction to the network system, wherein the execution result instruction includes the encryption execution result data.

12. The vehicle system according to claim 11, wherein the security chip is further configured to calculate a parity check code of the original execution result data; and the execution result instruction further comprises the parity check code of the original execution result data.

13. The vehicle system according to claim 9, wherein the local system is connected with the vehicle body system when the network system is disconnected from the vehicle body system, and the vehicle body system is configured to receive second control data from the local system and control the vehicle to perform a second target operation, wherein the second control data includes the second target operation.

14. The vehicle system according to claim 13, wherein the vehicle body system is further configured to transmit original execution result data for the second target operation to the local system after the vehicle performs the second target operation.

15. The vehicle system according to claim 13, wherein the system further comprises: an onboard display; and wherein the network system and the local system are connected to the onboard display via the selection switch, the selection switch is configured to connect a line connection between the onboard display and the network system when the selection switch is placed on a first switch position, and the selection switch is configured to connect a line connection between the onboard display and the local system when the selection switch is placed on a second switch position.

* * * * *